Jan. 19, 1965   J. G. GOERNER ETAL   3,166,276
SIGNAL LIMITING SYSTEM
Filed July 1, 1963   2 Sheets-Sheet 1
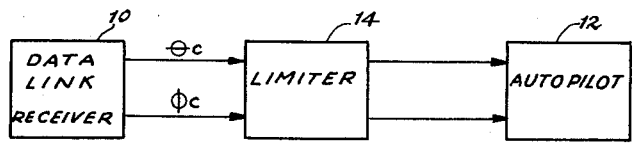
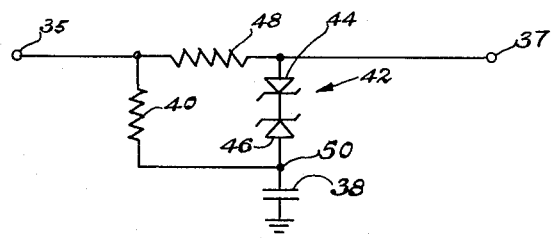
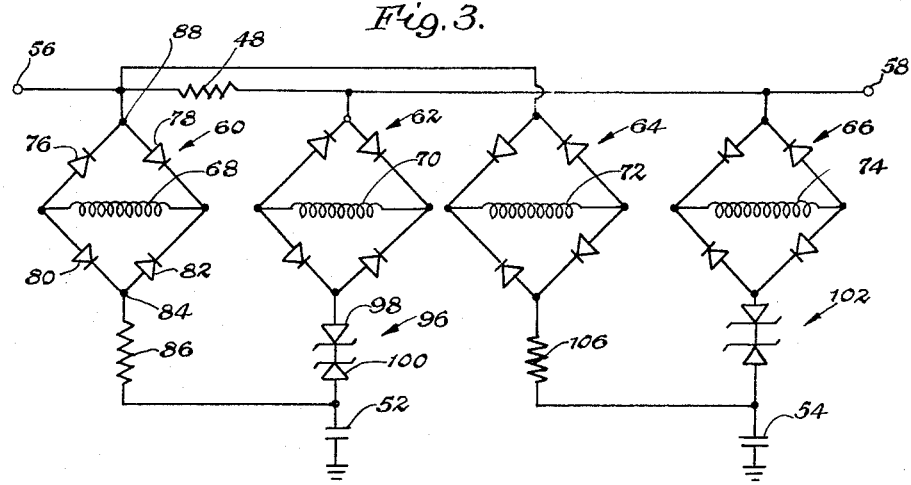
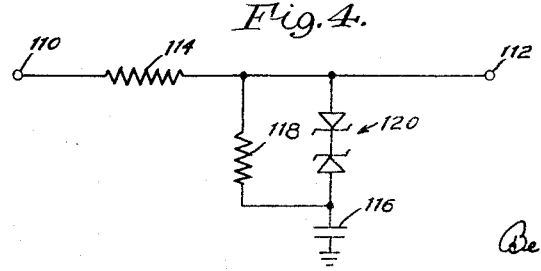
INVENTORS
JOHANNES G. GOERNER
THEODORE LERNER
CHARLES E. MARTIN
BY
Bean, Brooks, Buckley & Bean
ATTORNEYS United States Patent Office 3,166,276
Patented Jan. 19, 1965

3,166,276
SIGNAL LIMITING SYSTEM
Johannes G. Goerner, Snyder, Theodore Lerner, Amherst, and Charles E. Martin, North Tonawanda, N.Y., assignors to Bell Aerospace Corporation, Wheatfield, N.Y.
Filed July 1, 1963, Ser. No. 291,626
9 Claims. (Cl. 244—77)

This invention relates to automatic control systems for aircraft and pertains, more particularly, to such systems wherein the input to the autopilot is limited in such fashion that sudden extreme commands such as might be occasioned by malfunctions in the radar, computer or data link systems do not produce control responses which are either of such magnitude or of such rate that they cannot be properly counteracted by the pilot.

In copending application Serial No. 230,239 filed October 12, 1962 for an Automatic Landing System, there is disclosed an automatic landing system for aircraft wherein certain commands are transmitted to the aircraft where they are received by a data link receiver and ultimately transmitted as command functions to the aircraft autopilot. In such a system, should a sudden malfunction occur in the ground-based radar, the computer system or in the data link system, the possibility exists that abrupt command signals may be applied to the autopilot which are either of such magnitude or of such rate that they cannot be properly counteracted by the pilot. According to the present invention, limiter means is utilized in conjunction with such a system to avoid any such effect. At the same time, the limiting means in accordance with the present invention is of such character as to pass all commands which are necessary for the normal guidance of the aircraft while at the same time being effective to limit any sudden large changes due to malfunctions as specified hereinabove.

In accord with the present invention, it is of primary concern to provide limiting means wherein the same does not affect normal commands but which is effective to limit sudden, large magnitude commands and slow their rate of application to the autopilot to a rate which is within the capabilities of counteraction by the pilot.

More specifically, in accordance with the present invention, an automatic control for aircraft includes, in the connection between the data link receiver and the autopilot, limiting means including capacitance means having plural charging paths therefor, one of which permits the capacitance means to charge to the average D.C. level of normal command signals applied to the autopilot and another of which limits the instantaneous value of voltage change applied to the autopilot and which establishes a charging rate for the capacitor which is slow enough to permit counteraction by the pilot. In short, it is an object of this invention to limit the output of the data link in such a manner that sudden extreme erroneous commands are limited to a value which will not cause an intolerable attitude change of the aircraft.

Additionally, it is an object of this invention to provide a system as aforesaid in which the limiter will not limit such commands as are necessary to (a) compensate initial trim errors, (b) provide an average nose-down attitude in correspondence with the glide slope angle, (c) compensate by nosing-up the lift decrease due to air speed bleed off.

Other objects and advantages of the invention will appear from the description hereinbelow and the accompanying drawing wherein:

FIG. 1 is a block diagram illustrating the principles of the present invention;

FIG. 2 is a circuit diagram illustrating one form of limiter according to the present invention;

FIG. 3 is a circuit diagram illustrating another form of limiter according to the present invention;

FIG. 4 is a circuit diagram illustrating still another form of limiter according to the present invention;

Figure 5:
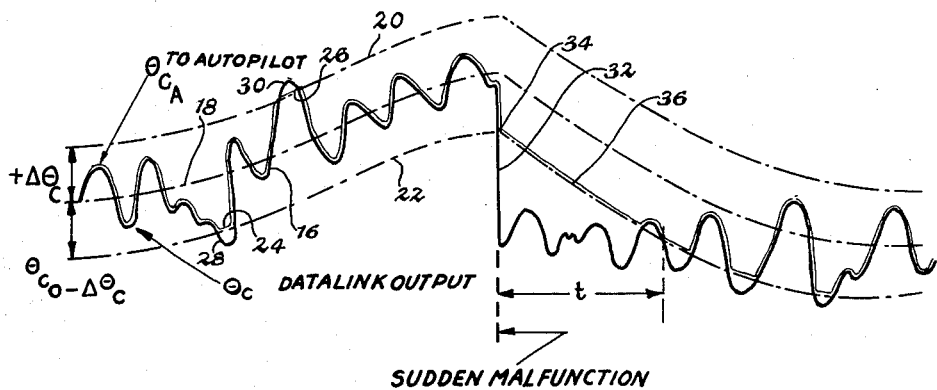
FIG. 5 is a waveform illustrating the effect of the circuit according to FIG. 2.

With reference to FIG. 1, as shown therein, the data link receiver 10 is coupled to the autopilot 12 through the limiter 14. The systems 10, 12 and 14 are airborne components of an automatic landing system for aircraft such as is shown, for example, in copending application Serial No. 230,239. The commands which are translated to the autopilot 12 may be in the form of pitch and roll commands $\theta_c$ and $\phi_c$ respectively and, according to the present invention, the control commands are coupled to the autopilot through the limiter means 14 such that sudden, extreme variations in command are limited to a value which will not cause intolerable attitude changes of the aircraft. Moreover, the limiter means acts in such manner as to avoid distortion of the command signals within the limits established. That is, the limiter means permits normal variation of the signal within narrow limits on either side of the average; but should a malfunction occur, the limiting means positively prevents variation of the signal beyond the specified limits at such rate as cannot be compensated or counteracted by the pilot. This is graphically illustrated in conjunction with the wave form shown in FIG. 5. In this latter figure, the command signal is indicated by the full line 16 while its average is indicated by broken line 18 and the limits established on either side, positive and negative with respect to the average, are indicated by the broken lines 20 and 22 respectively. As indicated by the dotted line portions 24 and 26, the limiter means prevents transfer to the autopilot, of signals which are in excess of the values established by the limits 20 and 22. Thus, the portions 28 and 30 of the command signal 16 are not transferred to the autopilot but, instead, these portions are limited as shown. Moreover, the rate of change of these limited portions of the signal, as indicated by the slopes of the lines 24 and 26, is such as to permit the pilot to counteract the effect of the same should they persist for such period of time as to establish an excessive command signal to the autopilot. It will be appreciated, however, that the duration of the portions 24 and 26 is so small that even if the pilot were aware of their presence, he would be unable to react quickly enough to counteract at these points. FIG. 5 illustrates, at 32, a sudden malfunction in some portion of the system and the command signal, at this point, has suddenly shifted far outside the limits defined between the lines 20 and 22. In response to such a malfunction, the command signal will decrease to the point 34 and will thereafter be applied along the lower limit line 36 until the command signal once again returns within the confines of the limit lines 20 and 22 as shown in the right-hand side of FIG. 5.

One form of limiter means may be constructed in accordance with the circuit shown in FIG. 2. In this figure, the output of the data link receiver is indicated by reference character 35 and the input to the autopilot by reference character 37. A capacitor 38 is provided with two charging paths connected to the output 35, one through the resistor 40 and one through the voltage breakdown reference means indicated generally by the reference character 42 and which, in the specific example shown, comprises a pair of oppositely poled Zener diodes 44 and 46. Further, the network includes the resistor 48 connected in series between the points 35 and 37. In operation, in response to command signals lying between the limit lines 20 and 22 as shown in FIG. 5, the capacitor 38 will charge to the average as indicated by the lines 18 in FIG. 5 through the resistor 40. However, should the command signal exceed the limits established by the lines 20 or 22, the voltage breakdown means 42 will effectively shunt the resistance 40 and charge the capacitance 38 directly through the resistor 48. Thus, it will be seen that the limit lines 20 and 22 are established on either side of the average 18 at points relative thereto which are equal in amplitude to the voltage characteristics of the breakdown reference means 42 which would be, in the specific instance shown, equal to the breakdown voltage of the backward biased diode plus the voltage drop across the forwardly biased diode. Thus, the voltage breakdown reference means 42 establishes the positions of the limit lines 20 and 22 on either side of the average 18 whereas the slopes of these lines are established by the time constant of the resistor 40 and capacitor 38 in series. The average voltage level is present at all times at the junction point 50 since the capacitor 38 is charged to this average D.C. level.

Figure 6:
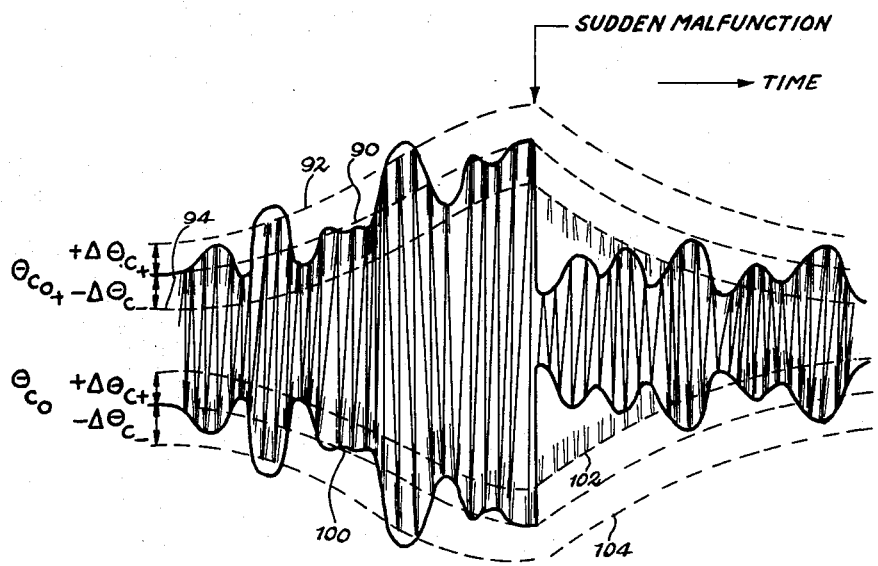
FIG. 6 is a waveform illustrating the effect of the circuit of FIG. 3.

If the command signal is supplied as an A.C. signal such as is shown in FIG. 6, the circuitry of FIG. 3 may be utilized. In this figure, a pair of capacitors 52 and 54 are utilized, the data link receiver output being indicated by the reference character 56 and the output to the autopilot by the reference character 58. A plurality of electronic switches 60, 62, 64 and 66 are utilized in conjunction with the plural charging paths of the capacitors 52 and 54. Each of the electronic switches 60, 62, 64 and 66 includes a secondary winding such as those indicated by reference characters 68, 70, 72 and 74, associated with a primary winding, not shown, coupled with a source of energy corresponding in frequency to the frequency of the carrier for the command signal. The transformer secondaries are wound so that when the switches 60 and 62 are on, the switches 64 and 66 are off and vice versa. During positive portions of an in phase command signal, the left-hand ends of the windings 68 and 70 are positive with respect to their right-hand ends so that there will be current flow between the opposite ends of these two windings through the two diodes 76 and 78 in series (referring to switch 60), and through the diodes 80 and 82 in series. The junction point 84 is connected to the capacitor 52 through the resistor 86 and the junction point 88 is connected to the output 56 as shown. Thus, if the value of command signal is positive with respect to the average to which the capacitor 52 is charged, there will be a net current flow through the diode 78, the transformer secondary 68, the diode 80, the resistor 86 to the capacitor 52; or, alternatively, if the instantaneous value of the command signal at junction 88 is below that of the capacitor 52, there will be a net current flow through the resistor 86, the diode 82, the transformer secondary 68 and the diode 76.

When, however, the in phase command signal is negative, the transformer secondary 68 and 70 will be negative at the left-hand ends with respect to their right-hand ends so that all of the diodes 76, 78, 80 and 82 will be back-biased thus effectively opening the switches 60 and 62, the operation of the switch 62 being identical with that described in conjunction with the switch 60 hereinabove. Thus, when the switch 60 is closed, the capacitor will charge to the average D.C. level of the positive portion of the command signal as is indicated by the line 90 in FIG. 6, and, similar to the operation explained in conjunction with FIG. 2, should the command signal suddenly exceed either of the limits 92 or 94, exceeding the voltage characteristics of the voltage breakdown reference means 96, the capacitor 52 will charge through the Zener diodes 98 and 100 of such reference means 96 during such times as the switch 62 is closed. The switches 64 and 66, as aforesaid, are opened when the switches 60 and 62 are closed and their operation is similar thereto. That is to say, when the in phase command signal is negative, the left-hand ends of the transformer secondary 72 and 74 will be negative with respect to their right-hand ends so that these switches are effectively closed. Conversely, when the command signal is positive, the left-hand ends of the transformer secondaries 72 and 74 will be positive thus effectively back-biasing their associated diodes which are poled as is illustrated in FIG. 3. Thus, for an in phase signal, the capacitor 52 charges to the average D.C. level as indicated by the line 90 in FIG. 6 whereas the capacitor 54 charges to the average D.C. level as indicated by the line 100 in FIG. 6, and the limits 102 and 104 are established by the voltage breakdown reference means 102 associated with the switch 66, the resistor 106 permitting the capacitor 54 to charge to the average D.C. level through the switch 64 when the command signals are within the limit lines 102 and 104.

The modification shown in FIG. 4 may also be used. In this figure, the data link output is indicated at 110 and the autopilot input at 112. A resistor 114 is connected in series between these points and the alternate charging paths to the capacitor 116 are through the resistor 118 and the voltage breakdown means 120. With this circuit, assigning the values $R_1$ and $R_2$ for the resistors 114 and 118, respectively, the output voltage will be $$\frac{R_2}{R_1+R_2}$$

times the input voltage.

It is to be understood that certain changes and modifications as illustrated and described may be made without departing from the spirit of the invention or the scope of the following claims.

We claim:
1. In an aircraft control system,
an airborne data link having an output responsive to ground-generated command signals,
limiting means connected to the output of said data link,
and an autopilot connected to said limiting means,
said limiting means including first resistor means connected in series between said data link and said autopilot; second resistor means and capacitor means connected in series with each other and in parallel with said data link; and voltage breakdown reference means connected between said autopilot and said capacitor means.
2. In the system as defined in claim 1 wherein said voltage breakdown reference means comprises a pair of oppositely poled Zener diodes.
3. In an aircraft control system,
an airborne data link receiver having an output responsive to ground-generated command signals,
an autopilot for controlling an associated aircraft,
and limiter means coupling the output of said data link receiver to said autopilot,
said limiter means including a capacitor, resistor means connecting said capacitor to the output of said data link receiver for charging the capacitor according to the average D.C. level of the data link receiver output signal, and voltage breakdown reference means connecting the input of said autopilot to said capacitor to limit the instantaneous level of voltage applied to said capacitor.
4. In an aircraft control system,
an airborne data link receiver having an output responsive to ground-generated command signals,
an autopilot for controlling an associated aircraft,
and limiter means coupling the output of said data link receiver to said autopilot,
said limiter means including a capacitor and plural charging paths connecting said capacitor to the output of said data link receiver, one of said charging paths including a resistor for charging said capacitor according to the average D.C. level of the output signal of said data link receiver within predetermined limits on either side of such average, and another of said charging paths including voltage breakdown reference means establishing such limits.

5. In the control system according to claim 4 wherein the last mentioned charging path also includes resistor means connected in series between said data link and said autopilot.

6. In the control system according to claim 4 wherein both of said charging paths also include resistor means connected in series between said data link and said autopilot.

7. In the control system according to claim 4 wherein each of said charging paths includes switch means closed only in response to positive voltage output from said data link receiver.

8. In an aircraft control system,
an airborne data link receiver having an output responsive to ground-generated command signals,
an autopilot for controlling an associated aircraft,
and limiter means coupling the output of said data link receiver to said autopilot,
said limiter means including a pair of capacitors, each having plural charging paths connecting the respective capacitors to the output of said data link receiver, one charging path of one capacitor including a resistor and switch means closed only in response to positive signals from said data link receiver for charging said one capacitor according to the average positive D.C. level of the output signal of said data link receiver within predetermined limits on either side of such average, the other charging path of said one capacitor including voltage breakdown reference means establishing such limits and switch means closed only in response to positive output signals from said data link receiver; one charging path of the other capacitor including a resistor and switch means closed only in response to negative signals from said data link receiver for charging said other capacitor according to the average negative D.C. level of the output signal of the data link receiver within predetermined limits on either side of such average, the other charging path of said other capacitor including voltage breakdown reference means establishing such limits and switch means closed only in response to negative signals from said data link receiver.

9. A limiter system for use between an airborne data link receiver and an autopilot connected to such receiver for obtaining control commands therefrom,
said limiter system including an RC circuit and a voltage breakdown reference means shunting part of the resistive portion of such RC circuit, said RC circuit including a pair of capacitors, each having plural charging paths connecting said respective capacitors to the output of the associated data link receiver, one charging path of one capacitor including a resistor and switch means closed only in response to positive signals, the other charging path of said one capacitor including voltage breakdown reference means and switch means closed only in response to positive signals, one charging path of the other capacitor including a resistor and switch means closed only in response to negative signals, and the other charging path of said other capacitor including voltage breakdown reference means and switch means closed only in response to negative signals.

References Cited by the Examiner
UNITED STATES PATENTS

| | | | |
|---|---|---|---|
| 2,858,433 | 10/58 | Rector | 323—81 |
| 3,037,129 | 5/62 | Le Bel | 307—88.5 |
| 3,058,068 | 10/62 | Hinrichs | 307—88.5 |
| 3,060,326 | 10/62 | Watson | 307—88.5 |
| 3,064,143 | 11/62 | Sanderson | 307—88.5 |
| 3,090,017 | 5/63 | Novic | 307—88.5 |
| 3,098,228 | 7/63 | Medlinski | 244—77 |
| 3,122,697 | 2/64 | Kauders | 323—9 X |

FERGUS S. MIDDLETON, *Primary Examiner.*

RALPH D. BLAKESLEE, MILTON BUCHLER,
*Examiners.*